Figures 4, 5:
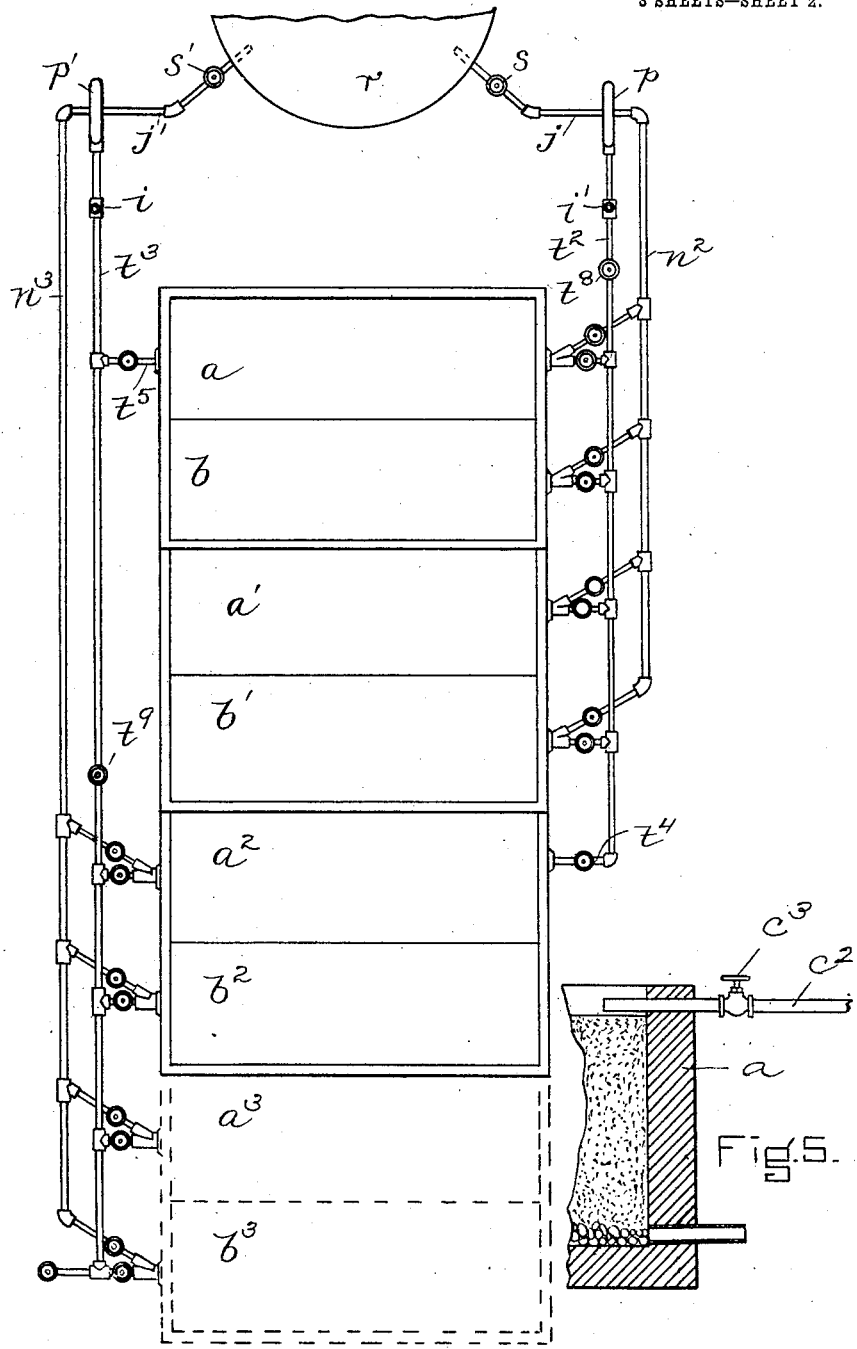

No. 762,466. PATENTED JUNE 14, 1904.
W. L. CHURCH & G. E. HILL.
SYSTEM OF SEWAGE DISPOSAL.
APPLICATION FILED MAR. 22, 1899.
NO MODEL. 3 SHEETS—SHEET 1.
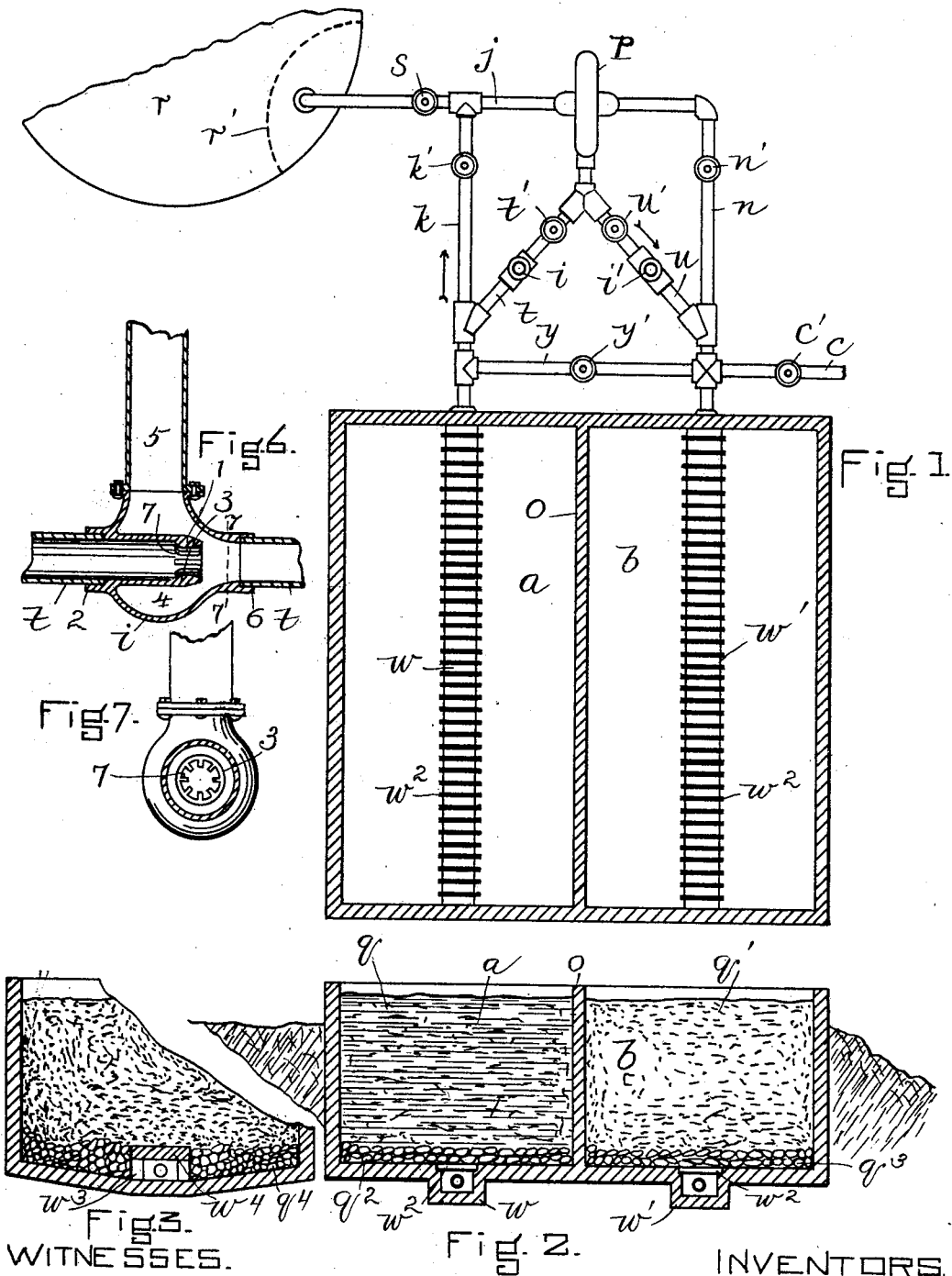
WITNESSES.
Matthew M. Blunt
P. W. Pezzetti
INVENTORS.
William L. Church
George Everett Hill
by Knight Brown & Quinby
ATTYS.

No. 762,466. PATENTED JUNE 14, 1904.
W. L. CHURCH & G. E. HILL.
SYSTEM OF SEWAGE DISPOSAL.
APPLICATION FILED MAR. 22, 1899.
NO MODEL. 3 SHEETS—SHEET 2.

WITNESSES. INVENTORS.

No. 762,466. PATENTED JUNE 14, 1904.
W. L. CHURCH & G. E. HILL.
SYSTEM OF SEWAGE DISPOSAL.
APPLICATION FILED MAR. 22, 1899.
NO MODEL. 3 SHEETS—SHEET 3.

Witnesses:
Walter P. Abell.
Fred D. Sweet.

Inventor:
W. L. Church.
G. E. Hill.
by Wright, Brown & Quinby
Attorneys

THE NORRIS PETERS CO., PHOTO-LITHO., WASHINGTON, D. C.

No. 762,466. Patented June 14, 1904.

UNITED STATES PATENT OFFICE.

WILLIAM L. CHURCH AND GEORGE EVERETT HILL, OF NEW YORK, N. Y.

SYSTEM OF SEWAGE DISPOSAL.

SPECIFICATION forming part of Letters Patent No. 762,466, dated June 14, 1904.

Application filed March 22, 1899. Serial No. 710,116. (No model.)

*To all whom it may concern:*

Be it known that we, WILLIAM L. CHURCH and GEORGE EVERETT HILL, of New York, in the county of New York and State of New York, have invented certain new and useful Improvements in Systems of Sewage Disposal, of which the following is a specification.

This invention relates to those systems of sewage disposal which have for their purpose the destruction of organic matter, both in suspension and solution, contained in the sewage. It is well established that the agents whereby the destruction is accomplished are certain species of scavenger bacteria which act by breaking down the complex organic structure of the matter contained in the sewage with the liberation of hydrogen and carbon dioxid and the conversion of the nitrogenous portion into nitrates. These bacteria are always abundant in the air and in the sewage itself, and the conditions of their activity are a plentiful supply of free oxygen, a moist atmosphere, suitable temperature, and the absence of direct sunlight.

A method heretofore proposed for destroying sewage in accordance with the above-mentioned principles has been to produce a flow of sewage through beds of porous material of considerable depth and supply air under pressure to the bottom of the beds, the air providing an excess of oxygen, which hastens bacterial action and also acting to remove the carbon dioxid, which would otherwise fill the voids in the porous beds and favor a true putrefactive action by substituting anaerobic for aerobic bacterial growth. Large volumes of air being required under considerable pressure to overcome friction, it has been found that the cost of power for the continuous night and day operation of the blower in this system is the principal item in the total cost of disposal. To reduce this cost in a large measure, to uniformly distribute the suspended organic matter through the porous material of the beds which are employed, and to simplify the construction of the plant are the principal objects of this invention.

In carrying out our invention we propose to cause the sewage to rise and fall periodically in a bed of porous material and to influence the level of the sewage by means of a pump. The movement of the liquid itself thereby operates as a piston, producing a perfect alternate inspiration of air and expiration of gases.

The invention will be readily understood by reference to the succeeding description and claims, taken in connection with the accompanying drawings, which represent an embodiment of our invention.

Figure 8:
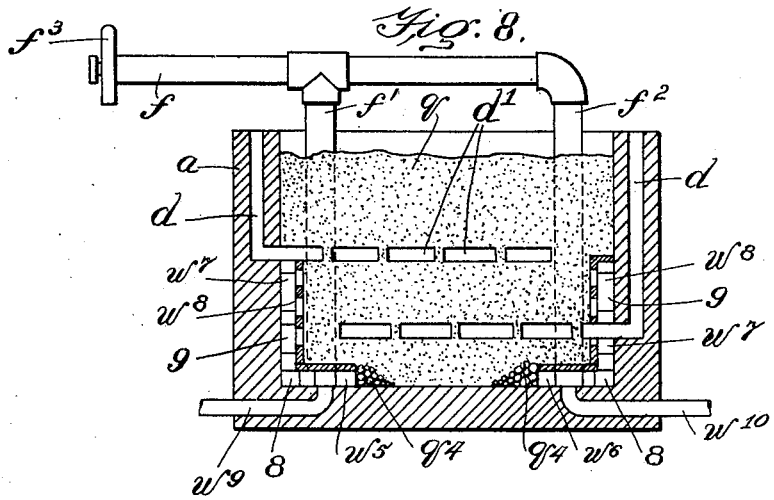
Figure 9:
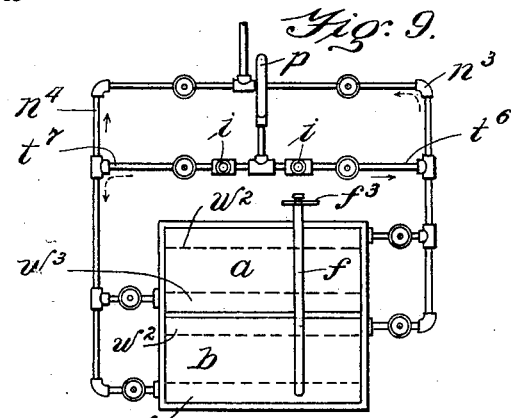
Figure 10:
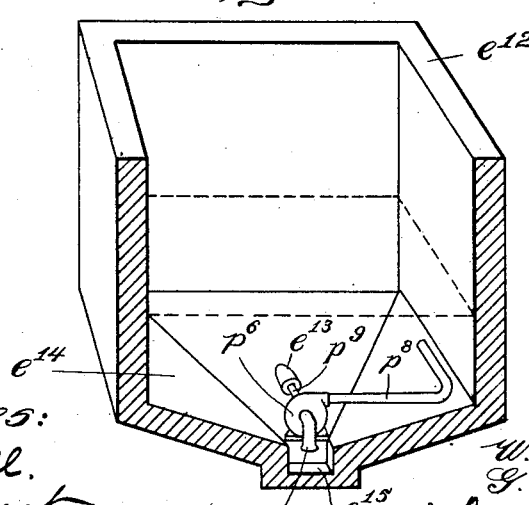

Of the drawings, Figure 1 represents a plan view of a sewage-disposal plant constructed in accordance with our invention. Fig. 2 represents a transverse vertical section of the purifying-tanks shown in Fig. 1. Fig. 3 represents a similar view of one tank, showing a modified form of tank. Fig. 4 represents a plan view showing the application of the invention to a plant of larger size. Fig. 5 represents a similar view of a tank, showing the surface discharge-pipe for the effluent. Fig. 6 represents a sectional view of an air-inspirator employed. Fig. 7 represents a section of said inspirator on the line 7 7 of Fig. 6. Figs. 8 and 9 represent views in section and plan, showing a modification. Fig. 10 represents a sectional perspective view of a pulping-tank.

Like reference characters indicate like parts in all the views.

Referring first to Figs. 1 to 7, inclusive, $a$ and $b$ designate two tanks placed alongside of each other and divided by a wall $o$. These tanks are filled to within a few inches of the top with fine granular material $q$ $q'$, which may be small pebbles, broken stone, crushed coke, or any clean hard material, preferably in size greater than one-half inch, and preferably, also, having a rough surface for the retention of a film of sewage or a deposition of solid matter. The bottom layer $q^2$ $q^3$ of this granular material may be six inches of large stone for the more uniform distribution of the sewage entering the tanks. At the bottom of each tank is a channel $w$ $w'$, covered by gratings or perforated tiles $w^2$, the purpose being, in connection with the lower layer of large stone, to cause the incoming fresh sewage to distribute its burden of fine suspended matter as uniformly as possible throughout the entire body of the porous bed. These channels could either take the form of conduits located below the floors of the tanks, as shown in Fig. 2, or the conduit might be located above the sloping floor of a tank and have open sides, as shown in Fig. 3, or the channels could be replaced by slotted pipes, as will be readily understood. The channels are preferably of a size to permit the passage of a man.

$r$ represents a collecting-well which is designed to receive the sewage from the infall and which, for the purposes of this description, may be assumed to have a volume sufficient to hold the flow of twenty-four hours, reckoning its volume between the invert of the sewer and the valve in the pump-suction pipe. The capacity of this well will also, preferably, be equal to the sewage-space in the tank $a$ or $b$—that is, the space in the voids of the porous material.

A pump $p$, preferably centrifugal, is provided, said pump having, by preference, a capacity adequate to handle a full day's sewage-flow in one hour or less and being connected with the well $r$ by a suction-pipe $j$, having a controlling-valve $s$. Screens at $r'$ in the well $r$ are designed to prevent the passage of refractory substances—such as rags, corks, lemon-skins, &c.—into the suction-pipe $j$. The pump is also connected with the channels $w$ $w'$ underneath the tanks $a$ $b$ by means of suction-pipes $k$ $n$, having controlling-valves $k'$ $n'$, and said pump is furthermore connected by branch delivery-pipes $t$ $u$, having controlling-valves $t'$ $u'$, with the channels $w$ $w'$. The channels $w$ $w'$ are connected across to each other by a pipe $y$, which may be termed a "by-pass," the said pipe having a controlling-valve $y'$. An effluent-line $c$ for discharging the purified sewage is connected with the channel $w'$ of the tank $b$ and is controlled by a valve $c'$. In Fig. 5, showing a modification, an effluent-line $c^2$, having a valve $c^3$, is shown leading from the top of the tank $a$, for a purpose hereinafter described. Air-inspirators $i$ $i'$ (shown in detail in Figs. 6 and 7) are placed in the pipe-lines $t$ and $u$. The said inspirators each comprise an inlet branch 2, ending in a jet or nozzle 3, which terminates in a chamber 4, formed by the outer casing of the inspirator. This chamber connects by a pipe 5 with the atmosphere and has a discharge branch 6, located beyond the end of the nozzle 3. When the sewage is forced through and out of the nozzle 3, it entrains or draws after it a quantity of air in crossing the open space in the chamber 4, which air becomes thoroughly mixed with the body of sewage passing on through the pipe 6. In order to increase the surface of the jet of liquid issuing from the nozzle 3 and its consequent frictional draft on the air, we may cast on the inside of said nozzle a number of inwardly-projecting vanes 7. These vanes give to the orifice of the nozzle a corrugated outline, which causes the issuing-jet to be deeply fluted or furrowed, thereby increasing its surface.

The operation is as follows: The valves $s$ and $t'$ being opened and all others closed, the pump $p$ lifts the sewage inflow of the previous day from the well $r$ and discharges it through the channel $w$ into the tank $a$, through which it uniformly and quietly rises until it shows at the surface of the filling material $q$. In passing through the inspirator $i$ the sewage becomes charged with air. Normal sewage is almost entirely devoid of air in solution. During the periods in which the sewage is standing in the full tank, as hereinafter described, the absence of oxygen would ordinarily prevent any measurable bacterial activity, and that total period, amounting to a considerable portion of the whole, would be alone devoted to subsidence of the solid matter of the sewage and would be practically lost as to any purifying effect by bacterial action. The inspirators $i$ and $i'$ serve to charge the sewage with an abundant supply of entrained or dissolved air, thereby insuring an almost continual activity of the bacteria and materially increasing the total efficiency of the plant. The operation of filling the tank $a$ with the full sewage flow of one day and also the subsequent operations may be assumed, for illustration, to occupy one hour each. When the tank is full, the valve $s$ is closed for the day, the valve $t'$ is closed, and the pump $p$ is stopped for an hour. The sewage is then allowed to stand quiescent in tank $a$ for a period of one hour, and the fine suspended matter contained therein settles by gravity on the surfaces of the filling material, while a partial clarification meanwhile progresses from the bacterial activity maintained by the entrained air supplied through the inspirator $i$. At the end of the second hour the valve $y'$ in the by-pass $y$ is opened and one half of the partially-clarified contents of tank $a$ is allowed to flow by gravity into tank $b$. When a practically common level is reached in the two tanks, the valve $y'$ is closed, valves $k'$ and $u'$ opened, the pump is started, and the remaining half of the contents of tank $a$ are transferred to tank $b$, the sewage being again aerated in its passage through the inspirator $i'$. This operation consumes the third hour, and it will be noted that as the level of the sewage subsides in tank $a$ and simultaneously rises in tank $b$ fresh air will be drawn down into every void in the porous material contained in tank $a$, while carbon-dioxid or other inert gases which have accumulated in the voids of tank $b$ by reason of the previous operation of said tank will be expelled. During the fourth hour, all valves being closed and the pump stopped, the entire body of material in bed $a$ will be the scene of intense bacterial activity in the presence of an excessive supply of air, which will consume at least a part of the organic matter deposited in said bed during the second hour. Meantime the full tank $b$ has taken up the work of further deposit and partial clarification by entrained air. The end of the fourth hour completes the first full cycle, and during the fifth hour the contents of tank $b$ are retransferred to tank $a$ by gravity via the by-pass $y$ and by pumping via the pipes $n$ and $t$ and the inspirator $i$. A new supply of crude sewage being drawn from the well $r$ only once a day, as has been assumed, a second four-hour cycle precisely like the first now commences to be followed by a third, and so on until at the end of the sixth cycle, after twenty-four hours, the work is complete and the effluent, now fully purified from its organic matter, both suspended and in solution, is discharged through pipe $c$ and valve $c'$ simultaneously with the recharging of tank $a$ with crude sewage from the well $r$, as at first.

When the tanks are used for the removal of the solid matter only in the sewage and the purification is carried no farther, it might be possible that a little coarse unconsumed matter would remain lodged in the channels $w$ $w'$ or gratings $w^2$. If such fragments should become lodged in the channels at the time of final discharge of the effluent, they might pass out with the effluent through the pipe $c$, which is undesirable. In partial purification, therefore, we prefer not to make the final discharge from the bottom of the tank, but from the top, and to this end we substitute for the pipe $c$ and valve $c'$ a surface discharge-pipe $c^2$ and valve $c^3$, as shown in Fig. 5. The discharge of the clarified effluent from the tank $b$ is then simply effected by the pumping in of the second charge of sewage from the tank $a$, displacing the clarified charge in tank $b$ and causing it to flow off through pipe $c^2$. When the purification is carried out to completion, the precaution of a final surface discharge is not necessary.

It may be remarked at this point that heretofore the raw sewage has usually been distributed over the top surface of the filter-beds, whereby the immediate surface soon becomes clogged with a layer of pasty sludge of greater or less thickness, depending upon the character of the sewage and the quantity applied. This has been found objectionable for several reasons. First, it prevents free access of air to the bed below it; secondly, the concentration of the sludge greatly retards its destruction; thirdly, the action of direct sunlight on this upper coating retards bacterial growth, and the sludge, which usually contains a large amount of woody fiber from toilet-paper, &c., dries into a blanket having a firm felt-like texture, effectually cutting off the air from its moister portions and from the filter-bed beneath. Partial putrefaction takes place, and the filter becomes offensive. It is therefore necessary to frequently break up and remove the felt blanket and at longer intervals to fork over the bed to a depth of some inches. The labor and cost of attendance are thereby increased. By employing the feature of subdistribution we obviate all these objections. Such solid matter as can pass through the screens in the well $r$ becomes beaten to an impalpable pulp in its repeated passages back and forth through the pump $p$. This not only removes all fear of clogging the lower layers of the bed, but is favorable alike to the thorough dissemination of the solid matter throughout the bed in thin deposits and its rapid attack and destruction by the bacteria. The organic matter in a finely-divided state is retained in darkness and moisture, under which conditions even the woody fiber speedily breaks down and disappears with the less refractory matter. We further find by experience that the cost of pumping in a system embodying our invention is very much less than the cost of blowing in the system of aeration hereinbefore referred to, this being partly due to the fact that one half the transfer between tanks $a$ $b$ is effected by gravity at no cost, and the work thrown on the pump is only that of raising, in the illustration assumed, one-half of the contents in alternate hours, one-half hour at a time, through a lift averaging one-half the depth of the tank, and twelve times a day. Over so low a lift a centrifugal pump is the most efficient form of pump which can be used. If local conditions compel the well $r$ to be considerably below the level of the tank $a$, thereby making the first lift much greater than the succeeding ones in the tanks themselves, a separate high-lift pump, independent of the pump $p$, may be employed for lifting the sewage up to said pump $p$.

While the typical unit of this system consists of two tanks working together, the principle of the invention is equally involved in a unit of three tanks, or even more, which might be employed in case sewage were encountered containing excessive quantities of refractory matter requiring a longer period of aeration than the average. To meet this condition, three tanks $a$ $b$ $a'$ could be employed connected in a suitable manner. These tanks could be worked, two at a time, in rotation, so that the equivalent of one tank standing idle for a full twenty-four hours of additional aeration would be provided. If made necessary by coarse matter passing the pump, the idle tank could be left to aerate for any longer period, as one week.

The system lends itself readily to extension, as will be noted by inspecting Fig. 4. Let the tanks $a$ $b$ and the pump $p$ be the first unit built. When an increase in population demands another unit, it is only necessary to add a second pair of tanks $a'$ $b'$ with suitable pipe connections, as shown. As the pump usually runs one-quarter of the time and never more than half, it can serve both pairs of tanks alternately. No additional collecting-well will be required, since in operating the double plant a full charge, representing twelve hours' flow, would be treated for twelve hours in the tanks $a\ b$ and then passed into the tanks $a'\ b'$ for twelve hours' final treatment, while the tanks $a\ b$ received and treated a second charge from the well $r$. In a doubled plant the second pair of tanks $a'\ b'$ would preferably be filled with a finer material than the first, such as coke-breeze or a coarse sharp clean sand, since all or most of the solid matter would be removed and consumed in the first tanks $a\ b$ and the larger surface presented by the finer material in the second tanks $a'\ b'$ is more favorable to the removal of the organic matter yet remaining in solution in the clarified effluent supplied to said tanks $a'\ b'$. A still further increase of sewage would be met by adding further pairs of tanks $a^2\ b^2$, $a^3\ b^3$, and so on. An additional pump, as $p'$, would be required for each additional section of four tanks.

The pump $p$ is connected by a delivery-pipe $t^2$ and suitable branch pipes leading therefrom with each of the four tanks in the first series, and also by an extension $t^4$ with the first tank $a^2$ in the second series. The outflow from the tanks of the first series is conducted by suitable branch pipes through a suction-pipe $n^2$ to the pump $p$, where connections are provided with suitable valves. The pump $p'$ is connected in similar manner by delivery and receiving pipes $t^3\ n^3$ and branches therefrom, with each of the tanks of the second series, and also by an additional offset $t^5$ from the delivery-pipe with the first tank $a$ of the first series. The valves $t^8$ and $t^9$, controlling the delivery to the two sets of tanks, serve, in effect, as by-pass valves, since by closing either of them and opening any two of the valves connecting the same line with the tanks the sewage can be transferred in part by gravity between any two desired tanks. The pairs of tanks, irrespective of the size of the plant, are preferably all worked in series, the time of treatment in each pair being proportionately shortened as the size of the plant increases. The successive pairs should preferably be filled with graded material of increasing degrees of fineness. In the full plant shown in Fig. 4 the sewage would be treated for six hours in each pair of tanks; but as all the pairs would at all times contain a charge at some stage of treatment the total capacity of the plant would be four times that of the initial pair of tanks $a\ b$. The collecting-well $r$ being once proportioned to the initial pair of tanks $a\ b$ need never be increased in size. The connection $t'$ from the pump $p$ enables the sewage to be passed on in regular sequence from the pair of tanks $a'\ b'$ to the pair $a^2\ b^2$, after which it is handled by the pump $p'$. The connection of said pump $p'$ by the suction-pipe $j'$ with the collecting-well $r$, as shown, and also by the branch $t^5$ with the tank $a$ is used in order that there may be no time lost while the pump $p$ is transferring the sewage charge from tank $b'$ to tank $a^2$. While this is being done the pump $p'$ is employed to conduct a charge of sewage from the well $r$ to the tank $a$. Considerable variation is permissible in the location, construction, and number of the channels at the bottom of the tanks. Thus in Fig. 2 the channel $w$ or $w'$ is located below the floor of the tank, while in Fig. 3 it is shown as located above the floor, being constructed in this latter case by setting up bricks $w^3$ on edge at some distance apart and supporting thereon a covering $w^4$ of flagstones or tiles. The sewage flows in and out at the sides between the bricks. Banks $q^4$ of large graded stones are laid against the openings between the bricks to prevent the finer filling material from washing into the channels and to assist in the uniform distribution of the sewage. While in Figs. 1, 2, and 3 we have shown in each tank one channel serving for both inflow and outflow, there is an advantage in certain cases in using two widely-separated channels, as shown at $w^5\ w^6$ in Fig. 8, with a solid bed of filtering material interposed between them. Any solid matter which might accidentally lodge in the inflow-channel is then retained therein until consumed, whereas with the single channel this matter might be swept back into the pipe by the return-flow. In the first tanks of the series this would not be objectionable—in fact, would be desirable, as it enables the said matter to be further broken up by the pump; but in the last tanks of the series such accidental matter might become discharged with the final effluent. The construction of separate inlets and outlets is therefore particularly desirable in the final tank or tanks of a series. When two channels are employed, as in Fig. 8, uniform distribution of the sewage may be aided by continuing the channels up the side of the tank, each channel having a lateral portion 8 extending along the bottom of the tank and a vertical portion 9 extending along the side of the tank, with conduits $w^9\ w^{10}$ communicating with the lateral portions. The vertical portions 9 of the conduits may be constructed by allowing headers or supporting-bricks $w^7$ to project from the side walls and placing thereagainst perforated tiles $w^8$, which are held securely in place by the lateral pressure of the filling material. The separate inlets and outlets permit of a simple arrangement of piping, whereby the flow in the tanks may be reversed. Such an arrangement is shown in Fig. 9, where it is seen that the delivery-pipe $t^6$ from the pump $p$ is connected with the channel $w^2$ in each of the tanks $a\ b$, as is also the outflow-pipe $n^3$ from the tanks to the pump. On the other side the delivery-pipe $t^7$ and the outflow-pipe $n^4$ are in like manner each connected with the channels $w^3\ w^3$ of said tanks. With this arrangement by appropriately arranging the valves in the pipes the sewage may be made to flow either in the direction of the full-line arrows or of the dotted-line arrows. The double arrangement is particularly advantageous in cases of excessively foul sewage, which when flowing through the beds in one direction only might tend to unduly clog the beds on the side nearest the inflow. To remedy this condition, the sewage after flowing for a period from, say, the channel $w^2$ to the channel $w^3$ could have its direction reversed, so as to flow from the channel $w^3$ to the channel $w^2$ in each tank.

It may be assumed that in the practical operation of our system of sewage disposal the filter-beds will have an average depth of seven feet, giving an average pumping lift in transferring the sewage from tank to tank of three and a half feet. This depth may be greatly increased where conditions such as the price of land and the limited area available demand it, and it is quite within good practice to operate beds of double this depth, or fourteen feet. In cases where an extreme depth of bed becomes necessary owing to a limited area at command it is possible that the air in slowly drawing down through the bed as the sewage-level subsides may have its oxygen so largely absorbed in the top layers of the bed that there would not be sufficient oxygen left to effectively oxidize the bottom layers, which are naturally somewhat the foulest. To meet this condition, special provisions are illustrated in Figs. 8 and 10 for aerating the deep layers of the bed. In Fig. 8 flues $d\ d$ are built, preferably, though not necessarily, in the walls of the tank and preferably extending to varying depths and communicating at their lower ends with air-laterals $d'\ d'$, traversing the filling material $q$. These laterals may be made of sections of sewer-pipe or drain-tile slightly separated or isolated from each other or laid with "open joints," each series of laterals forming, as seen, an interrupted prolongation of its flue or air conduit $d$. As the level of the sewage subsides in draining the flues $d\ d$ become successively unsealed, and air penetrates at once through the laterals $d'\ d'$ without previous deoxidation to all parts of the bed.

In dealing with exceptionally strong sewage it is good practice, as has been hereinbefore stated, to use a unit of three beds instead of two, allowing each bed in succession to remain idle for a long period—say from a day to a week. The "burning out" of the spare bed may be hastened if means are provided for artificially renewing the air either continuously or at frequent intervals. An arrangement for accomplishing this artificial aeration is shown in Figs. 8 and 9. $f$ is an air conduit or pipe having branches $f'\ f^2$ passing down through the body of the bed or built in the walls of the tank, as may be preferred, and communicating at their lower ends with the channels $w^5\ w^6$. The conduit $f$ may be connected with a suction-fan $f^3$, or when only an occasional aeration is required a steam-jet for providing the suction may be found more convenient, or the conduit may be connected with the ash-pit of the boiler or with the chimney-stack. When the tank is empty, the pipes $f'\ f^2$ will be unsealed, so that on starting the fan or jet a partial vacuum will be produced in the channels $w^5\ w^6$, causing the atmospheric air to sink uniformly down through the filling material as long as the fan or jet is running. In general the necessary renewal of air may be effected by running the fan or jet for only a few minutes at a time at intervals of several hours. This supplementary aeration pertains particularly to the first bed or beds of a series which deal with the solid matter in the sewage.

So important is the necessity of reducing masses of refractory material, such as paper, to a fine pulp, favorable to the subsequent action of the bacteria, that we consider it desirable to employ a pump in the capacity of a mechanical agitator or pulping-mill, even in cases where it is not required for lifting or transferring the sewage. Fig. 10 shows a tank $e^{12}$, which is preferably the screen-tank (the screens not being shown) and which has an inclined hopper-shaped floor $e^{14}$, converging in the middle to a shallow sump $e^{15}$. $p^6$ is a centrifugal pump placed inside the tank and normally submerged by the sewage therein, said tank having the orifice of its suction-pipe $p^7$ in the sump $e^{15}$ and the orifice of its discharge-pipe $p^8$ located at the upper end of the hopper-shaped floor. The shaft $p^9$ of the pump passes through a stuffing-box $e^{13}$ in the floor of the tank and is driven from the exterior of the tank. It will thus be seen that the subsided solid matter collecting at the bottom of the tank is sucked up by and passed through the pump, which breaks it up and discharges it at the highest part of the inclined floor, down which it is then swept by the circulation into the sump $e^{15}$ and again passes through the pump. While the pump and its connected pipes are shown as wholly within the tank and submerged under the sewage, it is manifest that its function will be performed, though less simply, if it is placed outside the tank with exterior pipe connections. The pump for pulping purposes must be of the centrifugal quick-running type, as a piston-pump would have no value as a pulping-mill.

It will be understood that various additional modifications may be made in the apparatus for carrying our invention into effect without departing from the spirit and scope of the invention, the embodiments shown in the drawings being selected merely for the purpose of clearly illustrating and explaining the invention.

The term "porous material" used in this specification includes material which in itself or in separate pieces may or may not be of a porous or open nature, as well as material—such as broken stone, gravel, or the like—which when broken up, granulated or comminuted, and aggregated in a loose mass forms a porous bed.

We claim—

1. That improvement in the art of sewage disposal which consists in causing a body of sewage to rise and subside through the same porous bed, introducing and withdrawing it through the bottom of said bed.

2. That improvement in the art of sewage disposal which consists in causing sewage to rise through the bottom of a porous bed, then to subside through the bottom of said bed, and coincidently to rise through the bottom of another porous bed.

3. That improvement in the art of sewage disposal which consists in introducing a body of sewage into a porous bed, withdrawing the sewage from said bed, and subsequently reintroducing the same body of sewage into said bed.

4. That improvement in the art of sewage disposal which consists in causing the sewage to alternately rise and subside through two or more porous beds, the sewage passing from one bed to the other, and then back to the first bed.

5. That improvement in the art of sewage disposal which consists in subjecting a body of sewage to successive purifications in a series of purifying receptacles by introduction and reintroduction of said body of sewage into said receptacles, and aerating the sewage in its passage from one receptacle to another.

6. That improvement in the art of sewage disposal which consists in introducing a body of sewage into a porous bed, allowing the sewage to stand quiescent therein for a period of time, then introducing said body of sewage into a second porous bed, allowing it to stand quiescent in said second bed for a period of time, and subsequently reintroducing said sewage into the first said bed.

7. That improvement in the art of sewage disposal which consists in subjecting a body of sewage containing a relatively large proportion of unreduced solids, to periods of mechanical disintegration alternating with periods of quiescent gravity deposition of solids.

8. That improvement in the art of sewage disposal which consists in subjecting a body of sewage containing a relatively large proportion of unreduced solids, to periods of mechanical disintegration alternating with periods of quiescent gravity deposition of solids in a series of two or more porous beds, introducing and reintroducing the sewage into the same beds, and following each period of deposition in a bed by a period of drainage and aeration of the bed.

9. That improvement in the art of sewage disposal which consists in forcibly aerating a body of sewage containing a relatively large proportion of unreduced solids, and then subjecting it to a quiescent period of simultaneous gravity deposition of solids and aerobic bacterial purification.

10. That improvement in the art of sewage disposal which consists in forcibly aerating a body of sewage containing a relatively large proportion of unreduced solids, and then subjecting it to a quiescent period of simultaneous gravity deposition of solids and aerobic bacterial purification, and alternating the said process between a series of two or more porous beds.

11. That improvement in the art of sewage disposal which consists in subjecting a body of sewage containing a relatively large proportion of unreduced solids to a succession of violent mechanical disintegrating actions as an accessory to bacterial conversion.

12. That improvement in the art of sewage disposal which consists in introducing a body of sewage into a porous bed, then draining said bed, and then aerating said bed by the maintenance of a sustained partial vacuum within or underneath the bed.

13. That improvement in the art of sewage disposal which consists in subjecting a body of sewage to successive purifications in a series of purifying-receptacles by introduction and reintroduction of said body of sewage into said receptacles, and then conducting said body of sewage to a second series of purifying-receptacles, and subjecting it to a like series of operations therein, meanwhile subjecting a second body of sewage to a like series of operations in the first said series of receptacles.

14. That improvement in the art of sewage disposal which consists in passing sewage into and out of a porous bed by introducing it at one locality in said bed and withdrawing it at another, and then reversing the direction of flow of the sewage in the bed by introducing it at the former outlet locality and withdrawing it at the former inlet locality.

In testimony whereof we have affixed our signatures in presence of two witnesses.

WILLIAM L. CHURCH.
GEORGE EVERETT HILL.

Witnesses:
 FREDERICK W. FARQUHAR,
 G. W. SWINBURNE, Jr.